United States Patent
Maul et al.

(10) Patent No.: US 10,502,569 B2
(45) Date of Patent: Dec. 10, 2019

(54) ROTATION RATE SENSOR AND METHOD

(71) Applicant: Robert Bosch GmbH, Stuttgart (DE)

(72) Inventors: Robert Maul, Reutlingen (DE); Mirko Hattass, Stuttgart (DE); Christian Hoeppner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 85 days.

(21) Appl. No.: 15/568,766

(22) PCT Filed: Mar. 11, 2016

(86) PCT No.: PCT/EP2016/055215
§ 371 (c)(1),
(2) Date: Oct. 23, 2017

(87) PCT Pub. No.: WO2016/173755
PCT Pub. Date: Nov. 3, 2016

(65) Prior Publication Data
US 2018/0128614 A1    May 10, 2018

(30) Foreign Application Priority Data

Apr. 29, 2015 (DE) .......................... 10 2015 207 856

(51) Int. Cl.
*G01C 19/5705* (2012.01)
*G01C 19/574* (2012.01)

(52) U.S. Cl.
CPC ....... *G01C 19/5705* (2013.01); *G01C 19/574* (2013.01)

(58) Field of Classification Search
CPC .................. G01C 19/5705; G01C 19/5712
See application file for complete search history.

(56) References Cited

U.S. PATENT DOCUMENTS

| 5,869,760 A | 2/1999 | Geen | |
|---|---|---|---|
| 6,308,567 B1 * | 10/2001 | Higuchi | G01C 19/56 73/504.08 |

(Continued)

FOREIGN PATENT DOCUMENTS

| DE | 199 59 369 A1 | 6/2000 |
|---|---|---|
| DE | 10 2006 052 522 A1 | 5/2008 |

OTHER PUBLICATIONS

International Search Report corresponding to PCT Application No. PCT/EP2016/055215, dated May 19, 2016 (German and English language document) (5 pages).

*Primary Examiner* — John E Chapman, Jr.
(74) *Attorney, Agent, or Firm* — Maginot, Moore & Beck LLP

(57) ABSTRACT

A rotation rate sensor includes a first rotationally suspended mass that exhibits a first axis of rotation. The first mass includes a first rotation-rate-measuring element that captures a first rate of rotation about the first axis of rotation and that outputs the first rate of rotation in a first signal. The sensor further includes a second rotationally suspended mass that exhibits a second axis of rotation and is arranged parallel to the first axis of rotation. The second mass includes a second rotation-rate-measuring element that captures a second rate of rotation about the second axis of rotation and that outputs the second rate of rotation in a second signal. The sensor further includes a propulsion device that propels the first and second mass and an evaluating device that outputs a difference of the signals as a third rate of rotation to be measured.

17 Claims, 3 Drawing Sheets

(56) References Cited

U.S. PATENT DOCUMENTS

| | | | |
|---|---|---|---|
| 6,837,107 B2 * | 1/2005 | Geen | G01C 19/5712 73/504.04 |
| 2004/0211257 A1 | 10/2004 | Geen | |
| 2007/0214883 A1 * | 9/2007 | Durante | G01C 19/5712 73/504.04 |
| 2010/0263446 A1 | 10/2010 | Tamura et al. | |

* cited by examiner

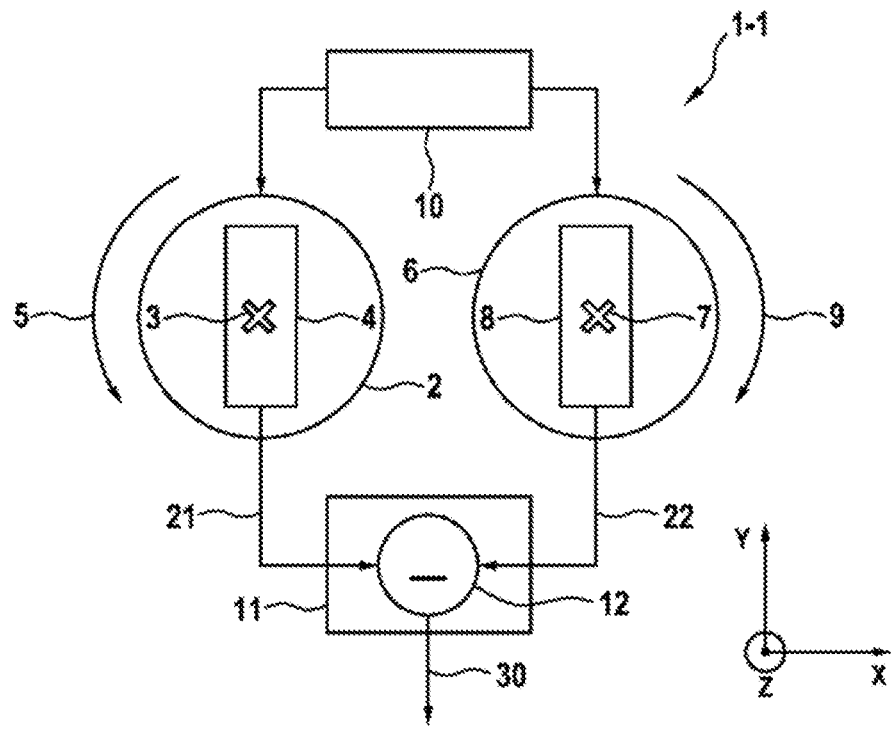

Fig. 1

S1 — EXECUTE AN OSCILLATION ABOUT A FIRST AXIS OF ROTATION USING A FIRST ROTATIONALLY SUSPENDED MASS

S2 — EXECUTE AN OSCILLATION, OPPOSITE TO THE OSCILATION OF THE FIRST MASS, ABOUT A SECOND AXIS OF ROTATION ARRANGED SPACED APART AND PARALLEL TO THE FIRST AXIS USING A SECOND ROTATIONALLY SUSPENDED MASS

S3 — CAPTURE A RATE OF ROTATION ABOUT A THIRD AXIS OF ROTATION, WHICH IS SPACED APART FROM AND PARALLEL TO THE FIRST AND SECOND AXES, USING A DIFFERENCE FORMED FROM A SIGNAL OF A FIRST ROTATION-RATE-MEASURING ELEMENT ARRANGED ON THE FIRST MASS, AND A SIGNAL OF A SECOND ROTATION-RATE-MEASURING ELEMENT ARRANGED ON THE SECOND MASS

Fig. 2

ROTATION RATE SENSOR AND METHOD

This application is a 35 U.S.C. § 371 National Stage Application of PCT/EP2016/055215, filed on Mar. 11, 2016, which claims the benefit of priority to Serial No. DE 10 2015 207 856.6, filed on Apr. 29, 2015 in Germany, the disclosures of which are incorporated herein by reference in their entirety.

The disclosure relates to a rotation-rate sensor and to a corresponding method for capturing a rate of rotation.

BACKGROUND

Rotation-rate sensors are employed nowadays in a large number of applications. For example, rotation-rate sensors can be employed in vehicles in order to capture the current motion of the vehicle. These data are needed, in order, for example, to be able to make an electronic stability program available in vehicles.

But rotation-rate sensors may, for example, also be employed in mobile communication devices—such as smartphones, for example—in order to capture a motion of the smartphone. This makes it possible to capture, for example, inputs to an application of the smartphone by virtue of the motion of the smartphone. For example, a map view of a street map can be moved in accordance with the motion of the smartphone.

In this connection, rotation-rate sensors may have been constructed as microelectromechanical systems, for example. Ordinarily such microelectromechanical systems consist of mass systems oscillating in antiparallel manner. By virtue of the Coriolis force, a deflection perpendicular to the propelling motion is generated which can be measured by means of suitable evaluation circuits.

Alternatively, concepts operating on the basis of a rotatory principle may also be employed, in which a mass is set in rotation or caused to execute a rotational oscillation, and a rate of rotation about the X-axis or Y-axis as a result of a tilting out of this plane is measured.

DE 10 2006/052 522 A1 presents such a rotation-rate sensor which is able to capture rates of rotation about two mutually perpendicular axes. If a structure for the capture of the rate of rotation about a third axis, for example the Z-axis, is to be integrated within such a sensor, a structure outside the rotor is ordinarily used for this purpose. If this structure were integrated on the rotor, this would have the consequence that the centrifugal force would overlay the Coriolis force and would render an evaluation of the signal difficult.

SUMMARY

The present disclosure discloses a rotation-rate sensor.
Accordingly, the disclosure provides:

A rotation-rate sensor with a first rotationally suspended mass which exhibits a first axis of rotation and a first rotation-rate-measuring element which is designed to capture the rate of rotation about the first axis of rotation and to output it in a signal, with a second rotationally suspended mass which exhibits a second axis of rotation, which is arranged parallel to the first axis of rotation, and a second rotation-rate-measuring element which is designed to capture the rate of rotation about the second axis of rotation and to output it in a signal, and with a propulsion device which is designed to propel the first mass and the second mass in such a manner that the first mass and the second mass execute rotary motions in opposite directions, and with an evaluating device which is designed to output a difference of the signals of the first rotation-rate-measuring element and of the second rotation-rate-measuring element as the rate of rotation to be measured.

The disclosure further provides:

A method for capturing a rate of rotation, comprising causing a first rotationally suspended mass to execute an oscillation about a first axis of rotation, causing a second rotationally suspended mass to execute an oscillation, which is in the opposite sense to the oscillation of the first mass, about a second axis of rotation which is arranged parallel to the first axis of rotation, and capturing a rate of rotation in a third axis of rotation, which is parallel to the first axis of rotation and to the second axis of rotation, by taking the difference formed from the signal of a first rotation-rate-measuring element (4), which is arranged on the first mass, and the signal of a second rotation-rate-measuring element which is arranged on the second mass.

The insight underlying the present disclosure consists in that in the course of a rotary motion the centrifugal force is always directed away from the center of rotation, whereas the Coriolis force depends on the direction of rotation.

Now the idea underlying the present disclosure consists in taking this insight into account and providing a rotation-rate sensor in which two masses are propelled in such a manner that the masses rotate in opposite directions about their respective axis of rotation or execute a rotatory oscillation.

The present disclosure further provides a rotation-rate-measuring element on each of the masses. As already explained above, the centrifugal force always points away from the center of rotation in the course of a rotation.

By taking the difference of the output signals of the rotation-rate-measuring elements, the signal components that are brought about by the centrifugal force consequently cancel each other out.

But since the Coriolis force is dependent on the direction of rotation, one of the rotation-rate-measuring elements generates a positive signal, and one of the rotation-rate-measuring elements generates a negative signal. By taking the difference formed from the two signal components having opposite algebraic signs, a rotation-rate signal consequently results that exhibits roughly twice the amplitude of the individual rotation-rate signals.

Advantageous embodiments and further developments result from the dependent claims and also from the description with reference to the figures.

In one embodiment, the rotation-rate sensor exhibits a coupling element which is designed to couple the first mass and the second mass with one another in such a manner that a common propulsion mode is formed in the course of propulsion of the first mass and of the second mass. This results in a joint or simultaneous motion of the individual masses, and enables a simple taking of the difference.

In one embodiment, the coupling element takes the form of the propulsion device. This makes possible a simple and not very complex structure of the rotation-rate sensor.

In one embodiment, the first rotation-rate-measuring element exhibits a first mobile detection mass and a second mobile detection mass, the first detection mass and the second detection mass being arranged on the first mass symmetrically on opposite sides of the first axis of rotation on a first line extending through the first axis of rotation. This enables a simple measurement of the forces that arise in the course of a rotation about the first axis of rotation.

In one embodiment, the second rotation-rate-measuring element exhibits a first mobile detection mass and a second mobile detection mass, the first detection mass and the second detection mass being arranged on the second mass symmetrically on opposite sides of the second axis of rotation on a second line extending through the second axis of rotation. This enables a simple measurement of the forces that arise in the course of a rotation about the second axis of rotation.

In one embodiment, the rotation-rate sensor exhibits at least two first evaluating electrodes which are arranged on each of the detection masses in such a manner that in the course of a rotation of the respective mass about the corresponding axis of rotation a measurable physical quantity between the respective first evaluating electrodes changes. For example, one of the first evaluating electrodes may take the form of the respective detection mass or a part of the respective detection mass. The second of the first evaluating electrodes may, for example, be arranged in the vicinity of the corresponding detection masses in such a manner that in the course of a motion of the detection masses a capacitance, a voltage, another electrical quantity or suchlike between the first evaluating electrodes changes.

In one embodiment, the first evaluating electrodes of the first mass and the first evaluating electrodes of the second mass are arranged in a differential circuit. This has the consequence that those signal components which are brought about by the centrifugal force are subtracted and those signal components which are brought about by the Coriolis acceleration are added.

In one embodiment, the differential circuit is made available by an interchanged polarity of the first evaluating electrodes of the first mass in comparison with the first evaluating electrodes of the second mass. This enables a very simple formation of the difference, since the electrical terminals of the first evaluating electrodes of the first mass and the electrical terminals of the first evaluating electrodes of the second mass can be simply electrically connected to one another.

In one embodiment, the rotation-rate sensor exhibits at least two second evaluating electrodes which are arranged in each instance on the first mass and on the second mass in such a manner that in the course of a rotation of the respective mass about a first axis, which is perpendicular to the respective axis of rotation, a measurable physical quantity between the respective second evaluating electrodes changes. This enables a measurement of the rate of rotation and/or of the acceleration in a first further axis.

In one embodiment, the rotation-rate sensor exhibits at least two third evaluating electrodes which are arranged in each instance on the first mass and on the second mass in such a manner that in the course of a rotation of the respective mass about a second axis, which is perpendicular to the respective axis of rotation and to the respective first axis, a measurable physical quantity between the respective third evaluating electrodes changes. This enables a measurement of the rate of rotation and/or of the acceleration in a second further axis.

In one embodiment, the first line and the second line are arranged at an angle of 90° to one another and in each instance at an angle of 45° to an axis that lies between the first mass and the second mass. In such an arrangement, the first further axis and the second further axis are not arranged at a 90° angle to one another; therefore the rates of rotation—for example, about the X-axis and the Y-axis—are not measured directly. Rather, the rates of rotation are captured in a coordinate system tilted by 45° and can be converted to a conventional 3-axis coordinate system having 90° angles between the axes.

The above configurations and further developments can be combined with one another arbitrarily, to the extent that this is sensible. Further possible configurations, further developments and implementations of the disclosure also encompass combinations, not mentioned explicitly, of features of the disclosure described previously or in the following with respect to the exemplary embodiments. In particular in this connection, a person skilled in the art will also add individual aspects as improvements or supplements to the respective basic form of the present disclosure.

BRIEF DESCRIPTION OF THE DRAWINGS

The disclosure will be elucidated in more detail below on the basis of the exemplary embodiments specified in the schematic figures of the drawings. Shown in these drawings are:

FIG. 1 a block diagram of an embodiment of a rotation-rate sensor according to the disclosure;

FIG. 2 a flow chart of an embodiment of a method according to the disclosure;

In all the figures, identical or functionally equivalent elements and devices have been provided with the same reference symbols, unless otherwise stated.

DETAILED DESCRIPTION

Figure 3:
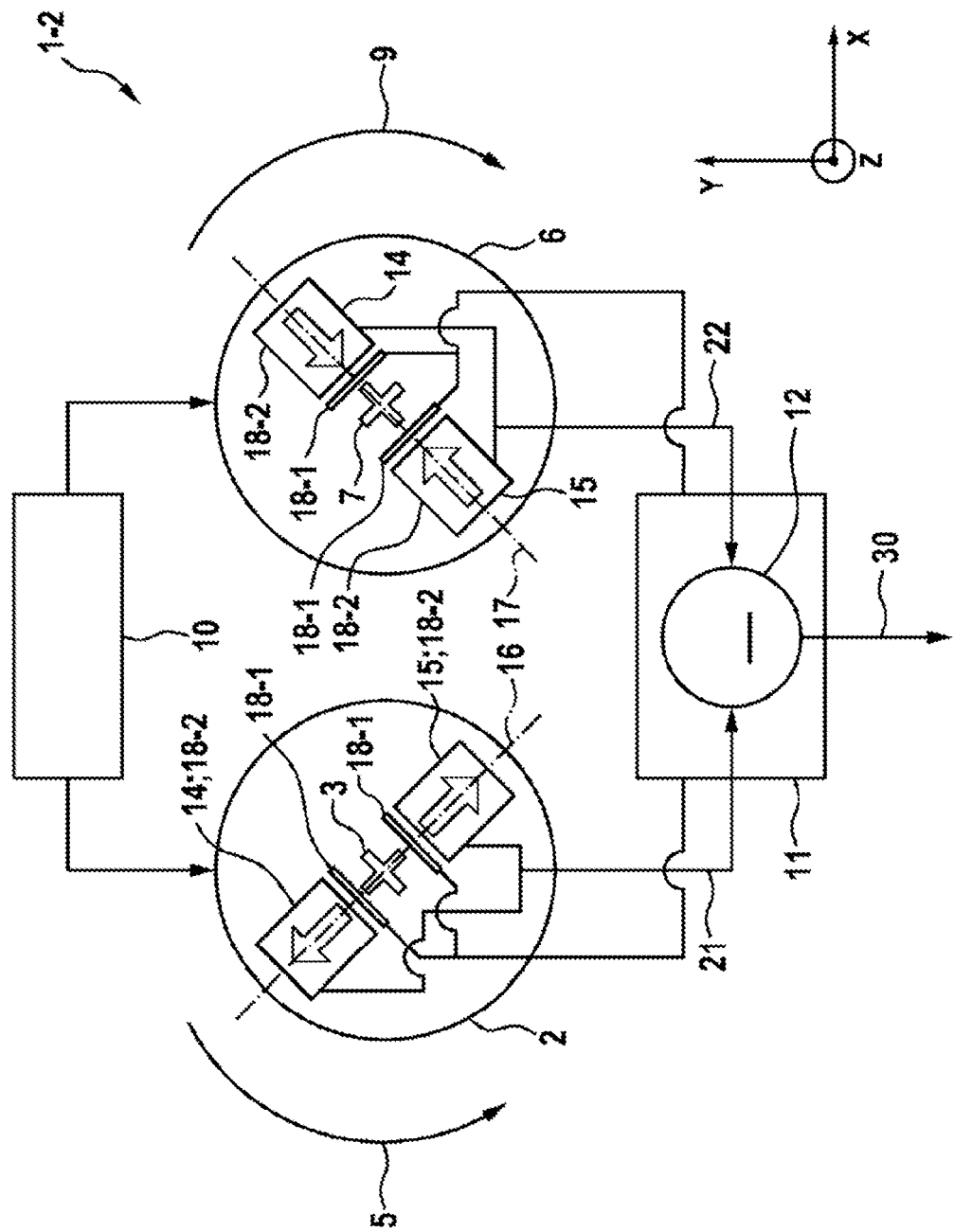
FIG. 3 a block diagram of a further embodiment of a rotation-rate sensor according to the disclosure.

FIG. 1 shows a block diagram of an embodiment of a rotation-rate sensor 1-1 according to the disclosure. In FIG. 1 a coordinate system is furthermore shown, in which the X-axis points to the right, the Y-axis points upward at a 90° angle to the X-axis, and the Z-axis points out of the plane of the drawing at a 90° angle to the X-axis and at a 90° angle to the Y-axis.

The rotation-rate sensor 1-1 shown in FIG. 1 exhibits two masses 2 and 6 which are rotationally suspended. In this context, "rotationally" means that the masses 2, 6 execute at least a rotatory oscillation. "Rotatory" does not have to mean that the masses 2, 6 execute a continuous rotary motion.

The first mass 2 in this case is suspended or fastened in such a manner that it executes a rotatory motion about a first axis of rotation 3. The second mass 6 is suspended or fastened in such a manner that it executes a rotatory motion about a second axis of rotation 7. The first axis of rotation 3 and the second axis of rotation 7 are, in particular, arranged parallel to one another.

Each of the masses 2, 6 further exhibits a rotation-rate-measuring element 4, 8 which is designed to capture a rate of rotation 5, 9 of the respective mass 2, 6 about the respective axis of rotation 3, 7 and to output a corresponding signal 21, 22.

The signal 21 of rotation-rate-measuring element 4 and the signal 22 of rotation-rate-measuring element 8 are interrogated and subtracted by an evaluating device 11. The evaluating device 11 outputs the result of the subtraction 12 as the rate of rotation 30 to be captured.

The rotation-rate sensor 1-1 further exhibits a propulsion device 10 which propels the two masses 2, 6 in such a manner that when the drive is active these masses execute an opposite-sense rotatory motion—that is to say, they execute a rotatory motion in opposite directions.

The rotation-rate sensor 1-1 according to the disclosure may in one embodiment take the form of a microelectromechanical (MEMS) rotation-rate sensor 1-1, for example.

In this case the propulsion device 10 may take the form of, for example, an electrostatic propulsion device 10 or suchlike.

FIG. 2 shows a flow chart of an embodiment of a method according to the disclosure for capturing a rate of rotation 30.

The method provides for causing, S1, a first rotationally suspended mass 2 to execute an oscillation about a first axis of rotation 3. Furthermore, a second rotationally suspended mass 6 is caused, S2 to execute an oscillation about a second axis of rotation 7 which is arranged parallel to the first axis of rotation 3, said oscillation being in the opposite sense to the oscillation of the first mass 2.

Finally, the capturing, S3, is provided of a rate of rotation 30 in a third axis of rotation, which is parallel to the first axis of rotation 3 and to the second axis of rotation 7, by taking the difference formed from the signal of a first rotation-rate-measuring element 4, which is arranged on the first mass 2, and the signal of a second rotation-rate-measuring element 8 which is arranged on the second mass 6.

For the purpose of simpler evaluation of the signals 21, 22 of the two masses 2, 6, the first mass 2 and the second mass 6 can be coupled with one another in such a manner that a common propulsion mode is formed in the course of the oscillation of the first mass 2 and the oscillation of the second mass 6.

In one embodiment, the method may provide the arranging of a first detection mass 14 and of a second detection mass 15 as the first rotation-rate-measuring element 4 on the first mass 2, and the arranging of a first detection mass 14 and of a second detection mass 15 as the second rotation-rate-measuring element 8 on the second mass 6.

In this case, the first detection mass 14 and the second detection mass 15 can be arranged on the first mass 2 symmetrically on opposite sides of the first axis of rotation 3 on a first line 16 extending through the first axis of rotation 3. Furthermore, the first detection mass 14 and the second detection mass 15 can be arranged on the second mass 6 symmetrically on opposite sides of the second axis of rotation 7 on a second line 17 extending through the second axis of rotation 7. In one embodiment in this case, the detection masses 14, 15 can be arranged in such a manner that the first line 16 and the second line 17 are arranged at an angle of 90° to one another.

For the purpose of simple evaluation of the rotation-rate-measuring elements 4, 8, at least two first evaluating electrodes 18-1, 18-2 can be arranged on each of the detection masses 14, 15 in such a manner that in the course of a rotation of the respective mass 2, 6 about the corresponding axis of rotation a measurable physical quantity between the respective first evaluating electrodes 18-1, 18-2 changes. For example, a capacitance or an electrical voltage between the first evaluating electrodes 18-1, 18-2 may change.

In one embodiment, a simple possibility for evaluation consists in interconnecting the first evaluating electrodes 18-1, 18-2 of the first mass 2 and the first evaluating electrodes 18-1, 18-2 of the second mass 6 in a differential circuit.

In one embodiment, the differential circuit can be made available as a passive differential circuit in which the contacts of the first evaluating electrodes 18-1, 18-2 are electrically coupled with one another directly. The taking of the difference can be provided by an interchanged polarity of the first evaluating electrodes 18-1, 18-2 of the first mass 2 in comparison with the first evaluating electrodes 18-1, 18-2 of the second mass 6.

For example, the first evaluating electrodes 18-1, 18-2 of the first mass 2 may have been designed in such a manner that they output a positive signal in the case of a rate of rotation 30 to be measured in a predetermined direction, and the first evaluating electrodes 18-1, 18-2 of the second mass 6 may have been designed to output a negative signal in the case of a rate of rotation in the predetermined direction.

It is furthermore possible to utilize the masses 2 and 6 for further rotation-rate measurements; to this end, measurable physical quantities in the course of a rotation of the respective mass 2, 6 about a first axis, which is perpendicular to the respective axis of rotation 3, 7, can be captured with least two second evaluating electrodes 19-1, 19-2 which are arranged on the respective mass 2, 6. Furthermore, measurable physical quantities in the course of a rotation of the respective mass 2, 6 about a second axis, which is perpendicular to the respective axis of rotation 3, 7 and to the respective first axis, can be captured with at least two third evaluating electrodes 20-1, 20-2 which are arranged on the respective mass 2, 6. As a result, with the aid of the method according to the disclosure it becomes possible to capture rates of rotation in three axes that is to say, for example, in the X-, Y- and Z-axes of the coordinate system shown in the further figures.

FIG. 3 shows a block diagram of a further embodiment of a rotation-rate sensor 1-2 according to the disclosure.

The rotation-rate sensor 1-2 shown in FIG. 3 is based on the rotation-rate sensor 1-1 shown in FIG. 1 and differs therefrom in that the rotation-rate-measuring elements 4 and 8 are not shown explicitly but are represented in each instance by two detection masses 14, 15.

Furthermore, the detection masses 14, 15 of the first mass 2 are arranged on a line 16 which is at a 45° angle to a perpendicular between the two masses 2, 6. In this case, detection mass 14 points outward that is to say, away from the second mass 6—and detection mass 15 points inward—that is to say, toward the second mass 6.

The detection masses 14, 15 of the second mass 6 are likewise arranged on a line 17 which is at a 45° angle to a perpendicular between the two masses 2, 6. In this case, line 17 is at a 90° angle to line 16. In this case, detection mass 14 points inward—that is to say, away from toward the first mass 2 and detection mass 15 points outward—that is to say, toward away from the first mass 2.

This arrangement of the masses 2 and 6 has the consequence that a tilting of the masses 2 and 6 out of the X-axis or out of the Y-axis is not captured directly. Rather, in the course of a tilting of the masses 2 and 6 out of the X-axis or out of the Y-axis a rate of rotation is captured in a coordinate system tilted by 45°. In the case of a pure tilting about the Y-axis or the Z-axis, components of the corresponding rates of rotation can consequently be captured at both masses 2 and 6. These components can be reckoned up in the course of the evaluation—for example, by a computing device such as, for example, an ASIC, a microcontroller or suchlike—in order to calculate the respective rate of rotation.

This has the advantage, furthermore, that the rates of rotation about the X-axis and the Y-axis are captured redundantly—that is to say, in two channels.

The detection masses 14, 15 may, for example, take the form of spring-suspended masses 14, 15 which can be moved out of their rest position by a force acting on the respective detection mass 14, 15. The motion of the detection masses 14, 15 out of their rest position can be captured by suitably attached evaluating electrodes 18-1, 18-2, for example, as shown in FIG. 3.

For this purpose, in the embodiment shown in FIG. 3 two evaluating electrodes 18-1, 18-2 are attached to each of the detection masses 14, 15. In FIG. 3 the first evaluating electrode 18-1 is arranged alongside the respective detection mass 14, 15. In FIG. 3 the respectively second evaluating electrode 18-2 takes the form of the respective detection mass 14, 15 itself. In further embodiments, the detection masses 14, 15 may exhibit dedicated evaluating electrodes 18-2.

The evaluating electrodes 18-1, 18-2 may, for example, take the form of plate-like structures, the normal of which points substantially toward the mid-point of the axis of rotation 3 of the rotational mass 2. If the corresponding detection mass 14, 15 is moved out of its rest position, the spacing between the plates of the first evaluating electrode 18-1 and of the second evaluating electrode 18-2 consequently changes, resulting in an alteration of a measurable physical quantity, for example a capacitance, an inductance, an impedance or suchlike.

The evaluating electrodes 18-1, 18-2 may, in particular, have been designed to capture a motion toward the center of rotation and away from the center of rotation.

Furthermore, in one embodiment the evaluating electrodes 18-1 and/or the evaluating electrodes 18-2 may take the form of differential evaluating electrodes 18-1, 18-2 in which two individual electrodes are provided in each instance. For example, they may have been arranged in such a manner that a measurable capacitance at one of the individual electrodes rises in the course of a motion of the respective detection mass 14, 15, and falls at the other of the individual electrodes in the course of the motion of the respective detection mass 14, 15. This already makes it possible to carry out a differential inspection separately for each of the detection masses 14, 15, and to eliminate a linear motion of the overall rotation-rate sensor from the result of measurement by the subsequent taking of the difference.

The arrangement shown in FIG. 3 enables a very simple capture of the rate of rotation 30 to be captured. The rate of rotation 30 to be captured corresponds in this case to a rate of rotation 30 of the overall rotation-rate sensor 1-2 and is independent of the rates of rotation of the individual masses 2, 6 which is generated by the rotatory motion of the masses 2, 6.

In the course of a rotation of the masses 2, 6, two different forces act on the masses 2, 6 or, to be more exact, on the respective detection masses 14, 15. On the one hand, a centrifugal force which is always directed outward from axis of rotation 3 or axis of rotation 7 acts on the respective detection masses 14, 15.

In the course of a subtraction of the signals 21 and 22, the signal components that are generated by the centrifugal force therefore cancel each other out.

But, in contrast to the centrifugal force, those signal components which are generated by the Coriolis force are dependent on the direction of rotation of the respective mass 2, 6. Since the masses 2, 6 execute opposite-sense rotatory motions, the signal components of the signals 21, that are generated by the Coriolis force therefore exhibit different algebraic signs. This has the consequence that by virtue of the subtraction 12 an output signal arises in which a signal component that is generated by the Coriolis force exhibits the sum of the corresponding signal component from the two signals 21, 22. In the case of identical construction of mass 2 and of mass 6, this signal component accordingly exhibits twice the magnitude in comparison with the individual signals 21, 22.

Figure 4:
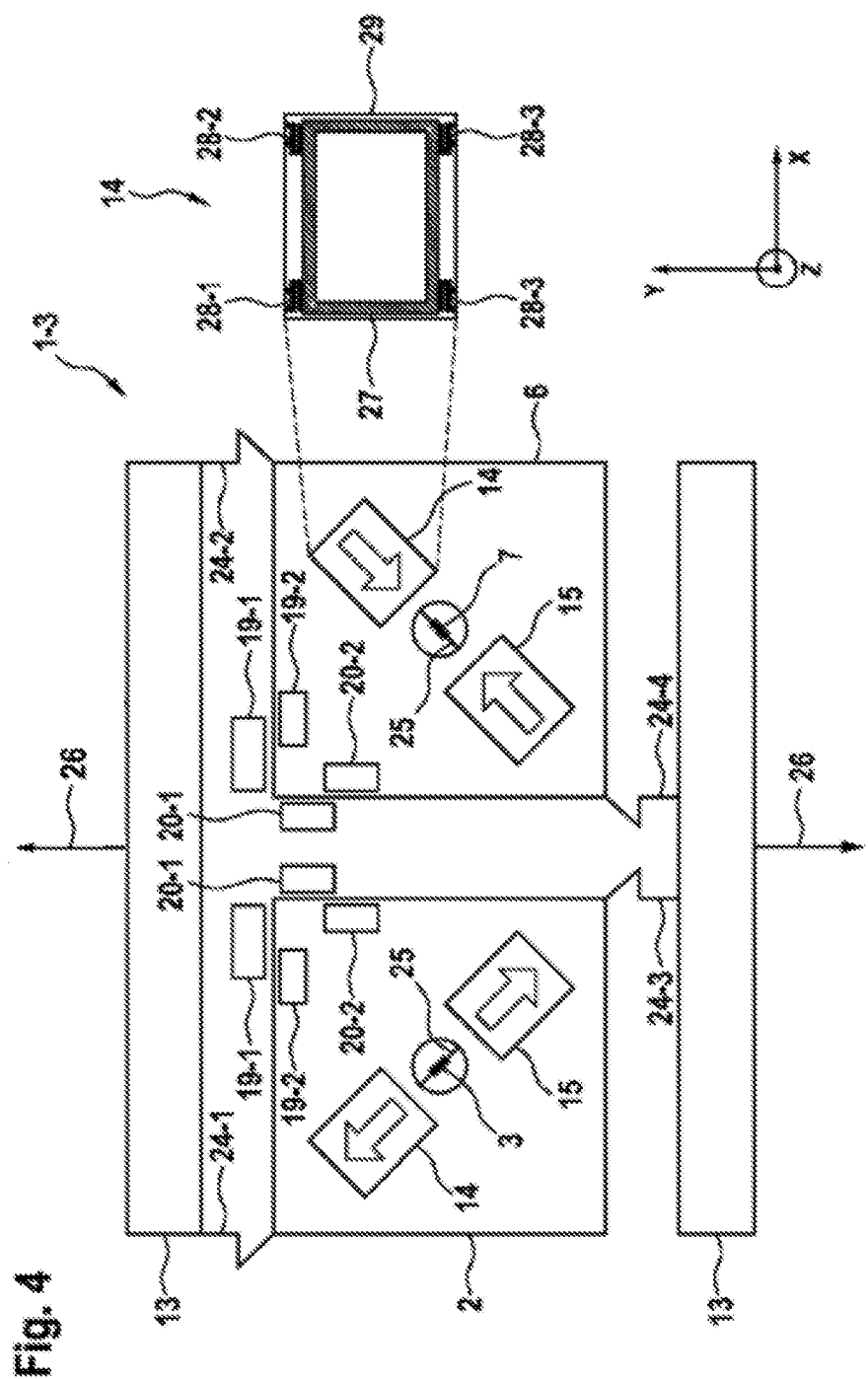
FIG. 4 a block diagram of a further embodiment of a rotation-rate sensor according to the disclosure.

FIG. 4 shows a block diagram of a further embodiment of a rotation-rate sensor 1-3 according to the disclosure.

Rotation-rate sensor 1-3 is based on rotation-rate sensor 1-2 shown in FIG. 3 and differs therefrom in that the masses 2 and 6 take the form of square masses 2, 6. In further embodiments, arbitrary further shapes of the masses 2 and 6 are possible.

The masses 2 and 6 are held in their center or in the respective axis of rotation 3, 7 by a spring element 25 which enables a rotatory motion of the respective mass 2, 6.

Furthermore, a coupling element 13, which takes the form of a carrier 13 or a frame 13, is provided which is coupled with the masses 2 and 6 via spring elements 24-1-24-4. In this case, one part of the frame 13 has been represented above the masses 2 and 6, and one part of the frame 13 has been represented below the masses 2 and 6. Further possible constituent parts of the frame 13 are likewise possible but, for the sake of clarity, are not shown.

In this case, springs 24-1 and 24-2 are attached to the upper outer corners of the masses 2 and 6, respectively, and springs 24-3 and 24-4 are respectively attached to the inner lower corners of the masses 2 and 6.

In FIG. 4 a force 26 pointing upward has been represented on the upper part of the carrier 13, and a force 26 pointing downward, which symbolizes a deflection of the carrier 13, has been represented on the lower part of the carrier 13. In the course of such a deflection of the carrier, the two masses 2 and 6 are set in an opposite-sense rotatory motion. If the carrier 13 is moved cyclically in direction 26, this results in an opposite-sense rotatory oscillation of the masses 2 and 6. In the embodiment represented, the carrier 13 can consequently also be utilized as the propulsion element 10.

In FIG. 4, further evaluating electrodes 19-1, 19-2 and 20-1, 20-2, which serve to capture the deflection of the masses 2 and 6 or the rate of rotation of the masses 2 and 6 in the X- and Y-directions, are attached in each instance to the masses 2 and 6.

Finally, an enlarged view of one of the detection masses 14, 15 is represented in FIG. 4. It can be discerned that the detection mass 14, 15 exhibits a mass 27 which is coupled with a frame 29 via spring elements 28-1-28-4. In this case, in the direction in which a motion of the detection mass 14, 15 is to be measured the spring elements 28-1-28-4 exhibit a lower spring stiffness than in the other directions. This embodiment of the detection masses 14, 15 is merely of exemplary nature. In further embodiments, the detection masses 14, 15 may also be constructed differently.

Although the disclosure has been described above on the basis of preferred exemplary embodiments, it is not restricted thereto but can rather be modified in a variety of ways. In particular, the disclosure can be changed or modified in many and various ways without deviating from the essence of the disclosure.

The invention claimed is:

1. A rotation-rate sensor comprising:
   a first rotationally suspended mass configured to exhibit a first axis of rotation, the first mass including a first rotation-rate-measuring element configured to capture a first rate of rotation about the first axis of rotation and to output the first rate of rotation in a first signal;
   a second rotationally suspended mass configured to exhibit a second axis of rotation arranged spaced apart from and parallel to the first axis of rotation, the second mass including a second rotation-rate-measuring element configured to capture a second rate of rotation about the second axis of rotation and to output the second rate of rotation in a second signal;

a propulsion device configured to propel the first mass and the second mass such that the first mass and the second mass execute rotary motions in opposite directions; and an evaluating device configured to output a difference of the first and second signals of the first rotation-rate-measuring element and of the second rotation-rate-measuring element as a third rate of rotation to be measured.

2. The rotation-rate sensor as claimed in claim 1, further comprising:

a coupling element configured to couple the first mass and the second mass with one another such that a common propulsion mode is formed during propulsion of the first mass and of the second mass.

3. The rotation-rate sensor as claimed in claim 2, wherein the coupling element is the propulsion device.

4. The rotation-rate sensor as claimed in claim 1, wherein:

the first rotation-rate-measuring element further includes first mobile detection mass and a second mobile detection mass, the first detection mass and the second detection mass arranged on the first mass symmetrically on opposite sides of the first axis of rotation on a first line extending through the first axis of rotation; and the second rotation-rate-measuring element further includes another first mobile detection mass and another second mobile detection mass, the other first detection mass and the other second detection mass arranged on the second mass symmetrically on opposite sides of the second axis of rotation on a second line extending through the second axis of rotation.

5. The rotation-rate sensor as claimed in claim 4, wherein the first line and the second line are arranged at an angle of 90° to one another.

6. The rotation-rate sensor as claimed in claim 4, further comprising:

at least two first evaluating electrodes arranged on each of the first and the second detection masses such that during rotation of the first mass about the first axis of rotation and rotation of the second mass about the second axis of rotation a measurable physical quantity between the at least two first evaluating electrodes of the first detection mass and the at least two first evaluating electrodes of the second detection mass changes, wherein the at least two first evaluating electrodes of the first mass and the at least two first evaluating electrodes of the second mass are arranged in a differential circuit.

7. The rotation-rate sensor as claimed in claim 6, wherein:

the differential circuit is configured to receive a first signal component generated by the at least two first evaluating electrodes of the first mass and a second signal component generated by the at least two first evaluating electrodes of the second mass; and a polarity of the first signal component is opposite from a polarity of the second signal component.

8. The rotation-rate sensor as claimed in claim 6, further comprising:

at least two second evaluating electrodes arranged in each instance on the first mass and on the second mass such that during rotation of the first mass and the second mass about a first axis, which is perpendicular to the respective first and second axes of rotation, a measurable physical quantity between the respective second evaluating electrodes changes; and at least two third evaluating electrodes arranged in each instance on the first mass and on the second mass such that during rotation of the first mass and the second mass about a second axis, which is perpendicular to the respective first and second axes of rotation and to the respective first axis, a measurable physical quantity between the respective at least two third evaluating electrodes changes.

9. The rotation-rate sensor as claimed in claim 1, wherein the third rate of rotation to be measured is about a third axis of rotation that is spaced apart from and parallel to each of the first axis of rotation and the second axis of rotation.

10. A method for capturing a rate of rotation, comprising:

executing an oscillation about a first axis of rotation using a first rotationally suspended mass;

executing, using a second rotationally suspended mass, an oscillation, which is opposite to the oscillation of the first mass, about a second axis of rotation which is arranged spaced apart from and parallel to the first axis of rotation; and capturing a rate of rotation in a third axis of rotation, which is parallel to the first axis of rotation and to the second axis of rotation, using a difference formed from a signal of a first rotation-rate-measuring element arranged on the first mass, and a signal of a second rotation-rate-measuring element arranged on the second mass.

11. The method as claimed in claim 10, comprising:

coupling the first mass and the second mass such that a common propulsion mode is formed during the oscillation of the first mass and the oscillation of the second mass.

12. The method as claimed in claim 10, further comprising:

arranging a first detection mass and a second detection mass on the first mass as the first rotation-rate-measuring element, the first detection mass and the second detection mass arranged on the first mass symmetrically on opposite sides of the first axis of rotation on a first line extending through the first axis of rotation; and arranging another first detection mass and another second detection mass on the second mass as the second rotation-rate-measuring element, the other first detection mass and the other second detection mass arranged on the second mass symmetrically on opposite sides of the second axis of rotation on a second line extending through the second axis of rotation.

13. The method as claimed in claim 12, wherein the first and the second detection masses and the other first and the other second detection masses are arranged such that the first line and the second line are arranged at an angle of 90° to one another.

14. The method as claimed in claim 12, further comprising:

arranging at least two first evaluating electrodes on each of the first and the second detection masses, such that in the course of a rotation of the respective first and second masses about the corresponding axis of rotation a measurable physical quantity between the at least two first evaluating electrodes of the first mass and the at least two first evaluating electrodes of the second mass changes;

wherein the at least two first evaluating electrodes of the first mass and the at least two first evaluating electrodes of the second mass are interconnected in a differential circuit.

15. The method as claimed in claim 14, wherein the at least two first evaluating electrodes of the first mass are configured to output an opposite electronic polarity in response to a positive rate of rotation about the first axis of rotation in comparison with an electronic polarity of the output of the at least two first evaluating electrodes of the second mass in response to a positive rate of rotation about the second axis of rotation.

16. The method as claimed in claim 10, further comprising:
- capturing a measurable physical quantity during rotation of the respective first and second masses about a first axis, which is perpendicular to the respective first and second axes of rotation, with at least two second evaluating electrodes arranged on the respective first and second masses; and
- capturing a measurable physical quantity during a rotation of the respective first and second masses about a second axis, which is perpendicular to the respective first and second axes of rotation and to the respective first axis, with at least two third evaluating electrodes arranged on the respective first and second masses.

17. The method as claimed in claim 10, wherein the third axis of rotation is spaced apart from each of the first axis of rotation and the second axis of rotation.

* * * * *